Jan. 5, 1943. A. S. HARLAN 2,307,676
FLUID TRANSMISSION AND CLUTCH CONTROL
Filed July 10, 1941
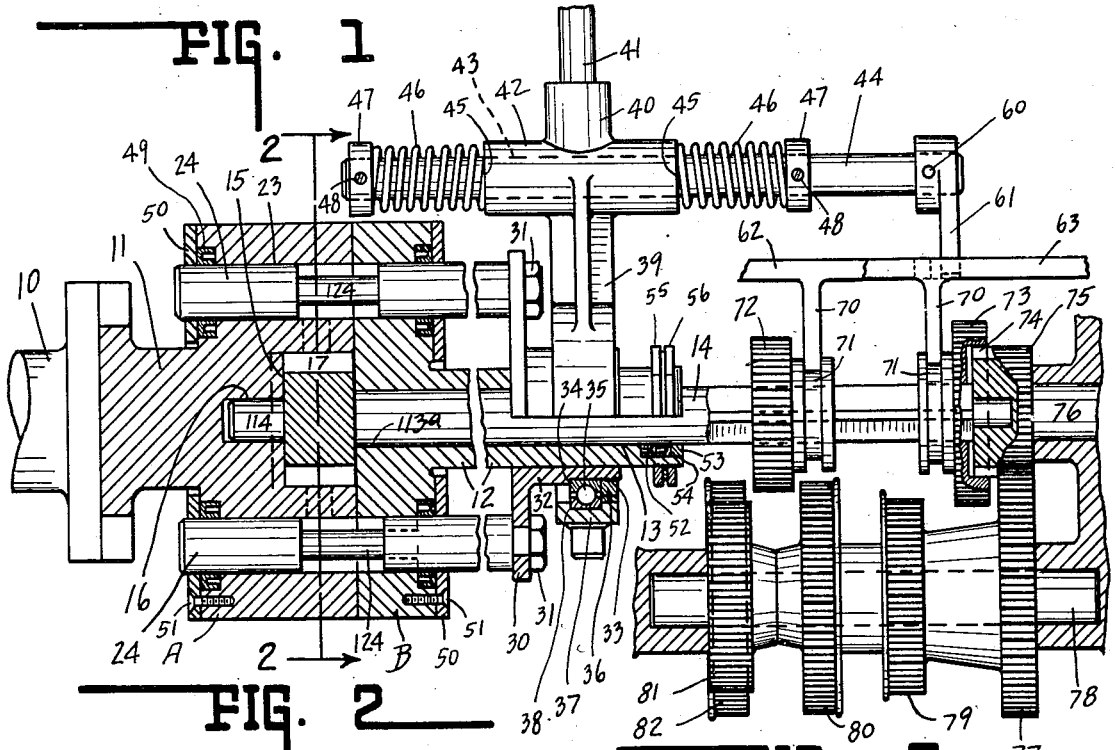
INVENTOR.
AVERY S. HARLAN.
BY Lockwood, Goldsmith & Galt,
ATTORNEYS.

Patented Jan. 5, 1943

2,307,676

UNITED STATES PATENT OFFICE 2,307,676

FLUID TRANSMISSION AND CLUTCH CONTROL

Avery S. Harlan, Beech Grove, Ind.

Application July 10, 1941, Serial No. 401,855

9 Claims. (Cl. 74—189.5)

This invention relates to a power transmission system.

The chief object of this invention is to provide a singular control for a gear shift mechanism and a clutch structure.

One feature of the invention consists in utilizing a fluid type clutch and associating therewith a control, the fluid type clutch being interposed between a driving and a driven shaft, the driven shaft in turn being arranged to drive through a multiple gear transmission, the driven shaft constituting one of the elements of that transmission, the gearing being adapted for selective connection to a propeller shaft.

Another feature of the invention is in providing a single control whereby the clutch is automatically controlled when it is desired to shift gears so that there is no power connection between the driving and the driven shaft during the interval that the gears are being disengaged from each other and the gears are being reengaged with each other.

A further feature of the invention consists in connecting the immediate gear shifting member and the immediate clutch controlling member by a yielding type connection so arranged, as previously set forth, that meshing of the gears and unmeshing thereof cannot be effected so long as the clutch is in a position to transmit any power from the driving shaft to the driven shaft.

The full nature of the invention will be understood from the accompanying drawing and the following specification and drawing:

In the drawing,

Fig. 1 is a central sectional view through the fluid clutch construction and a side elevational view of a part of a conventional transmission gear set and the included invention.

Fig. 2 is a transverse sectional view taken on line 2—2 of Fig. 1 and in the direction of the arrows.

Fig. 3 is a view similar to Fig. 1 and of the fluid clutch structure only and is taken at right angles to the section shown in Fig. 1.

Fig. 4 is a diagrammatic plan view of the shifter bar arrangement in conventional transmission gear constructions.

In the drawing, 10 indicates a power input shaft which is suitably coupled to a member 11 so that it is rigid therewith. This member 11 is provided with an elongated extension 12 which is tubular, the bore therein being indicated by the numeral 13. The driven shaft in that bore is indicated by the numeral 14. The bore 13 is extended as at 113a into the member 10 opposite from the shaft 10 connected to the member 11 and is enlarged laterally as at 15.

A reduced bore 16 is coaxial with the bore portion 113 and mounts the reduced end 114 of the shaft 14. The shaft 14, in the chamber 15, is provided with the gear 17. This gear meshes with two diametrically positioned gears 18, see Figs. 2 and 3. These gears 18 are mounted in lateral extensions 115 of the central chamber 15. These chambers have oppositely extending bore portions 19, see Fig. 3, mounting shafts 20, which, in turn, mount the gears 18.

As shown in the Figs. 1 and 3, the housing structure 11, which rotates with the driving shaft 10, is a two-part structure indicated by letters A and B and being suitably secured together, A being rigid with the part 11 and B being rigid with the extension 12.

Within this housing arrangement, there are provided four chambers 21 and it will be noted that in the partition 22 that provides two adjacent chambers 21 there is provided a bore 23, see Figs. 1 and 2, which mounts a slidable valve member 24. Communicating with the bore 23 and the adjacent chamber 21 is the passage 25. Communication between two adjacent chambers 21 through the aligned passages 25 and the bore 23 is controlled by valve member 24. The central portion 26 of the housing structure, provided with the central chamber 15 and the lateral chambers 115, is provided with passages 27 therethrough, said passages at one end communicating with the chamber 21 and at the other end communicating with the several gear receivable chambers.

When power is applied to shaft 10, the entire housing 11 is rotated. If it be assumed the shaft 14 be stationary, then the gear 17 is stationary. Rotation, therefore, of the entire housing 11 will cause the fluid to flow from one chamber 21 through passage 27 to the meshing gears and then flow from the meshing gears through the other passage 27 to the chamber 21 opposite the previous chamber and separated by one of the gears. All chambers and gears function alike.

The fluid flow from one chamber 21 to the other chamber 21 through the passages 25, if the valve provides no restriction, thus insures free circulation of the fluid from chamber 21 to chamber 21 and consequently, the gear 17 will not be rotated relative to the member 11. If, however, the two valves 24 be completely closed, cutting off all communication between the adjacent aligned passages 25, the gear 17 is locked to the gears 18 and direct drive is effected between the driving shaft 10 and the driven shaft 14. It will be apparent that any intermediate position of the valves 24 so that the communication between aligned passages 25, is between fully closed position or fully restricted or in wide open position or wholly unrestricted, will accordingly drive the shaft 14 from the shaft 10 at a proportional rate.

As shown clearly in Figs. 1 and 2, the controlling valves constitute solid members 24 which have internal or intermediate reduced portions 124. These reduced portions are of predetermined length for the following reason: These valves are required to be simultaneously shifted by the shifter plate 30 to which each of the valves is secured as at 31. The length of the reduced portion 124, as stated, is critical so that the remaining mechanism can be shifted in operative association and in combination with the shifting for gear shift purposes before valve control is effected and vice versa.

The plate 30 has a tubular extension 32 which is threaded as at 33 and is provided with a shoulder 34. An anti-friction structure 35 bears against the shoulder and the retainer 36 also bears against the anti-friction structure and has threaded connection with the threaded portion 33 of the tubular extension 32, which tubular extension is concentric with and axially slidable upon the tubular extension 12.

A collar 37 is channeled as at 38 to nest the anti-friction structure 35. This collar includes an extension 39 which at its upper end 40 is socketed to receive a gear shifting lever or manually operable member 41, only the lower portion of which is illustrated.

Between portions 39 and 40 there is provided a laterally directed enlargement 42 which is apertured at 43. Mounted in this aperture 43 is a rod or bar member 44 and encircling the same at each side of the portion 42 and bearing upon the faces 45 thereof are the springs 46. These springs 46 at their opposite ends bear upon collar 47 secured as at 48 to the rod or shaft member 44. These collars may be adjustably secured to the member 44 to adjust the force of said springs 46.

It will be apparent from the foregoing that as the member 41 is moved to and fro from right to left that clutch control is effected. It also will be apparent that this unit also may be oscillated to and fro in a direction transverse to the previous to and fro movement, since the element 39 rigid with the member 37 may rotate on the anti-friction structure 35.

Various fluid seals may be utilized, as indicated at 49, and adjacent the ends of the sliding valves 24, and these may be retained in position by plates 50 secured to the body portions A and B as at 51. The connection between the tubular portion 12 and the shaft 14 may be suitably sealed against fluid leakage by means of the seal structure 52 retained by the member 53 having threaded engagement with the member 12 as at 54. The collar member 55 locked as at 56 constitutes a stop limiting right hand movement of the manually operable control member 39 and plate 30. Left hand movement thereof naturally is limited by contact of the plate 30 with the plate 51.

Reference now will be had more particularly to Figs. 1 and 4. The rod 44 is extended as illustrated and on the extended free end has secured thereto as at 60 the depending gear shifting control member 61. This depending gear shifter control member is arranged to oscillate between two shifter bars 62 and 63, one having the notch 64 therein and the other having the notch 65 therein, respectively. When the shifter member 61 is seated in the notch 65 and the member 41 is moved toward the left, see Fig. 4, the gear shift mechanism associated with these shifter bars also will be in the reverse driving position or relationship. When, however, the shifter bar 63 has been engaged by the member 61 and moved to the right in Fig. 4, then the gear mechanism will be in the low speed position. When the shifter member 61 associated with the notch 64 and the bar 62 is moved to the left, then the gear mechanism will be in the intermediate gear position. When the bar 62 is moved to the right and as shown in Fig. 4, the gear mechanism or transmission will be in high speed or "direct" drive position.

The immediate right hand portion of Fig. 1 constitutes a conventional, elevational disclosure of a conventional gear shift mechanism. Depending from each shifter bar is the portion 70, each portion 70 being associated with a grooved arrangement 71 carried by a gear, the latter being a gear splined to the shaft 14 or driven shaft and for driving the propeller shaft therefrom in the direction and selected gear ratio.

The numeral 72 indicates the low speed and reverse transfer gear, 73 indicates the high and intermediate speed transfer gear having internal teeth 74. Gear 75 is rigid with propeller shaft 76 and meshes constantly with gear 77 is countershaft 78 on which is mounted intermediate speed gear 79, low speed gear 80 and reverse gear 81. An intermediate gear 82 constantly meshes with gear 81.

When gear 72 meshes with gear 82, shaft 76 rotates reversely and at a low speed. When gear 72 meshes with gear 80 shaft 76 rotates at the lowest forward speed. When gear 73 meshes with gear 79 shaft 76 rotates forward at the intermediate speed. When teeth 74 mesh with gear 75, shaft 76 is direct coupled to shaft 14 or in high speed position.

Since this construction is well understood in the automative art, no further illustration or explanation is believed necessary except the following:

The critical feature of the present disclosure is as follows: When it is desired to shift gears, the only manipulation or manual movement required is to move the lever 41. That movement initially moves the valves in the fluid clutch to the neutral position—that is, wherein the shaft 14 is not under power in any way from the shaft 10 and then the gear change is effected. Upon effecting that gear change, the continued movement of the member 41 positions the clutch controlling valves 24 in proper position and thus the relationship between the rate of rotation of shaft 10 and shaft 14 can be controlled. This particular and peculiar action is made possible through yieldingly connecting the shifter bar operating mechanism 61 through the shaft or rod 44 and the springs 46 to the portion 42 of the manually operated structure 39—40—41 or clutch control.

As previously stated, initial movement of member 41 is translated to the valves 24 so that at the instant the gears of the transmission are selected and are in meshing relation, there is no power drive or power connection between the shafts 10 and 14. After the gears are in mesh, the valves are shifted further for full power application therebetween or partial power application therebetween, the yielding connection permitting such clutch control. Thus, the member 41 may be used as a throttle control and the action is comparable to that commonly termed "slipping the clutch" in the conventional mechanical clutch arrangement, with this exception, however, that such slipping of the clutch in a mechanical clutch arrangement does wear out the clutch lining face, whereas in the present invention there is no clutch lining to wear out and consequently, the equivalent of slipping the clutch for throttle control purpose herein is not injurious, and in no way reduces the life of the fluid clutch or impairs power operation.

While the invention has been illustrated and described in great detail in the drawing and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. A power transmission system including a driving shaft, a driven shaft, an intermediate driven shaft, a gear type transmission between the driven and intermediate shafts for multi-gear ratio forward and reverse driving including a plurality of confronting notched shifter bars, a fluid clutch of variable power transmitting type between the driving and intermediate shafts, and a single means adapted for selective operation of the transmission and simultaneous control of the fluid clutch whereby the clutch is ineffective for power transmission during transmission change movement and after such change gradually applies power to the transmission and to the desired degree, said clutch serving as a power regulator when desired.

2. In combination a singular, manually operable control member, a fluid clutch including control valve means directly connected to the member for clutch control, a gear type transmission including selector members, and a single shiftable member for selective association with the selector members, and a yielding connection between the shiftable member and the control member.

3. In combination a driving shaft, a driven shaft axially aligned therewith, a fluid clutch therebetween and including control valve means rotatable with one of the shafts, a control member for said clutch valve means rotatably mounted and concentric with the other of the shafts for oscillation about that shaft axis and capable of to and fro movement longitudinally of the axial alignment, a gear type transmission including selector members, a single shiftable member selectively associatable with the selector members, each having to and fro movement, and means yieldingly connecting the shiftable member to the control member for shiftable member movement simultaneously with valve means control.

4. A combination as defined by claim 3, characterized by the valve means being of reciprocable character, said valve means at the intermediate portion of the reciprocation being without clutch control, shiftable member movement for selective association with the selector members occurring prior to the valve means movement effecting power control through the fluid clutch.

5. A combination as defined by claim 2, characterized by the valve means being of reciprocable character, said valve means at the intermediate portion of the reciprocation being without clutch control, movement of the shiftable member for selective association with the selector members occurring prior to the valve means movement effecting power control through the fluid clutch.

6. A unitary shifter structure including a manually engageable operating member, a clutch control member rigid therewith, a gear transmission selector member, said clutch control member being rotatively mounted for oscillation upon a fixed axis and capable of movement longitudinally relative thereto, both movements being in accordance with the directly connected manually engageable operating member manual movement thereof, an elongated member connected to the selector member, and a lost motion including mechanical connection between the elongated member and the clutch control member for sequential control purposes in control member movement.

7. A unitary shifter structure including a manually engageable operating member, a clutch control member rigid therewith, a gear transmission selector member, said clutch control member being rotatively mounted for oscillation upon a fixed axis and capable of movement longitudinally relative thereto, both movements being in accordance with the directly connected manually engageable operating member manual movement thereof, an elongated member connected to the selector member, and a lost motion including mechanical connection between the elongated member and the clutch control member for sequential control purposes in control member movement, said lost motion connection including an aperture through one of the said control and elongated members, the other of said members extending therethrough, and spring means on each side of the apertured member and at one end operatively bearing thereon, the other end of said spring means having operative association with the said other member remote from the aperture seated portion thereof.

8. In a fluid clutch structure having a driving and a driven shaft axially aligned therein, and a plurality of fluid control valves movable to and fro therein, a singular member connected to all valves for simultaneous control thereof, said clutch having a housing in which said valves are mounted, the housing being rigid with one shaft and rotatable therewith, the other shaft being rotatably supported by said housing, a member slidably mounted and concentric with a shaft and oscillatably supported and connected to the singular member for valve reciprocation, and a gear type transmission connected to the driven shaft and driven thereby and including a singular control member operatively connected to the slidable-oscillatable member for transmission-clutch conjoint control.

9. In a fluid clutch structure having a driving and a driven shaft axially aligned therein, and a plurality of fluid control valves movable to and fro therein, a singular member connected to all valves for simultaneous control thereof, said clutch having a housing in which said valves are mounted, the housing being rigid with one shaft and rotatable therewith, the other shaft being rotatably supported by said housing, a member slidably mounted and concentric with a shaft and oscillatably supported and connected to the singular member for valve reciprocation, and a gear type transmission connected to the driven shaft and driven thereby and including a singular control member operatively connected to the slidable oscillatable member for transmission-clutch conjoint control, the last mentioned operative connection being of cushioned lost motion character.

AVERY S. HARLAN.